No. 731,545. PATENTED JUNE 23, 1903.
N. CERNATESCO.
MOTOR ROAD VEHICLE.
APPLICATION FILED APR. 1, 1902.
NO MODEL. 3 SHEETS—SHEET 2.
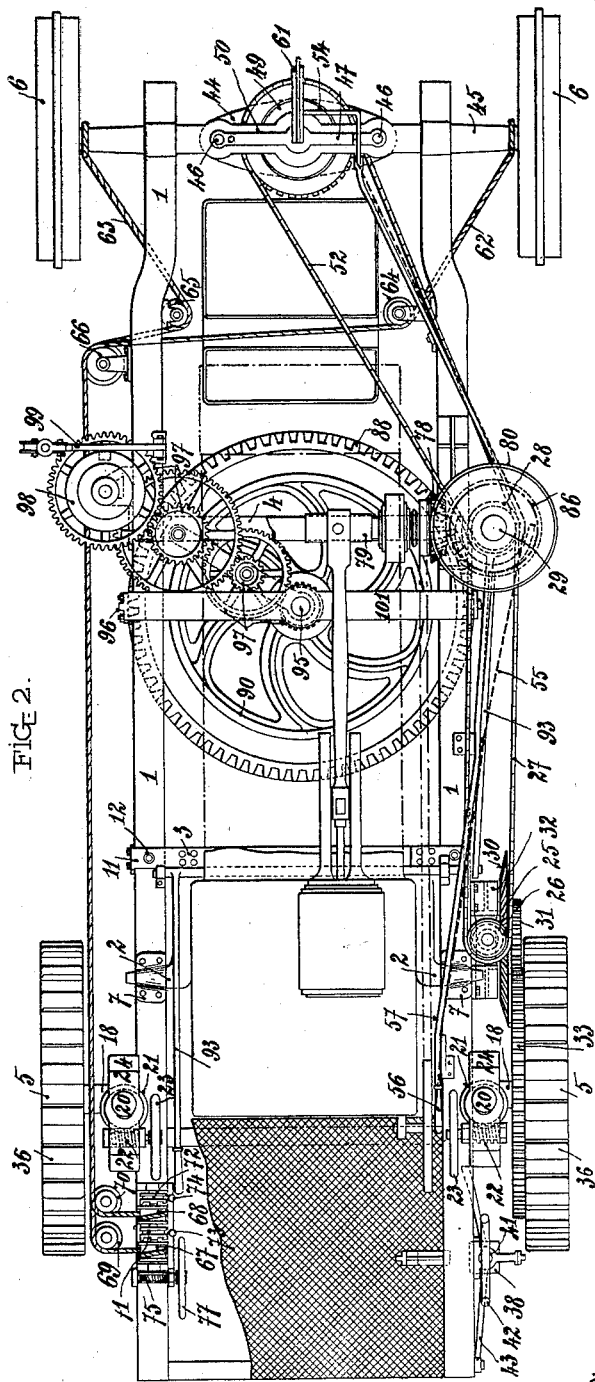
Witnesses
Inventor
Nicolas Cernatesco
By Wm C Boulter
Attorney No. 731,545. PATENTED JUNE 23, 1903.
N. CERNATESCO.
MOTOR ROAD VEHICLE.
APPLICATION FILED APR. 1, 1902.
NO MODEL. 3 SHEETS—SHEET 3.
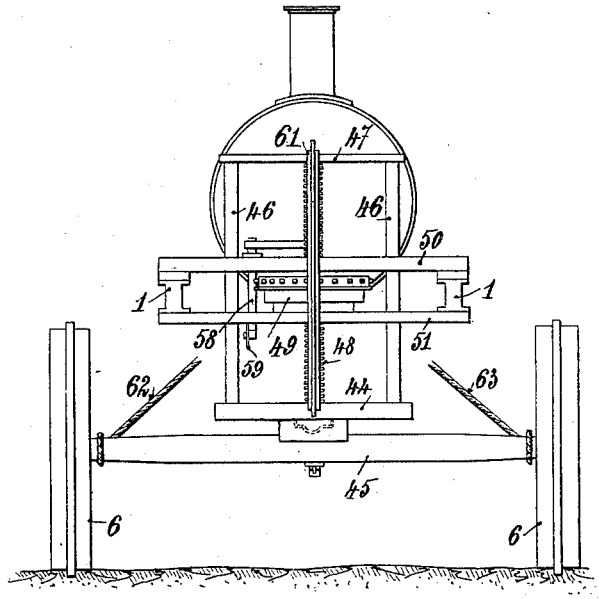
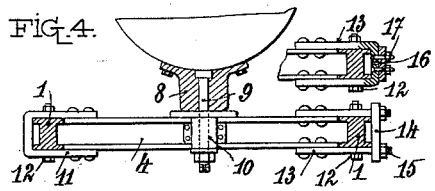
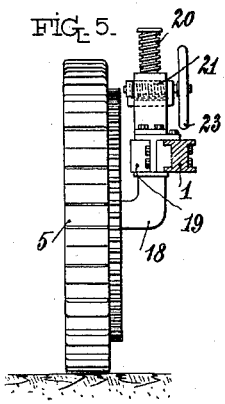
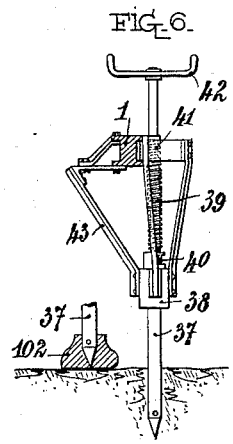

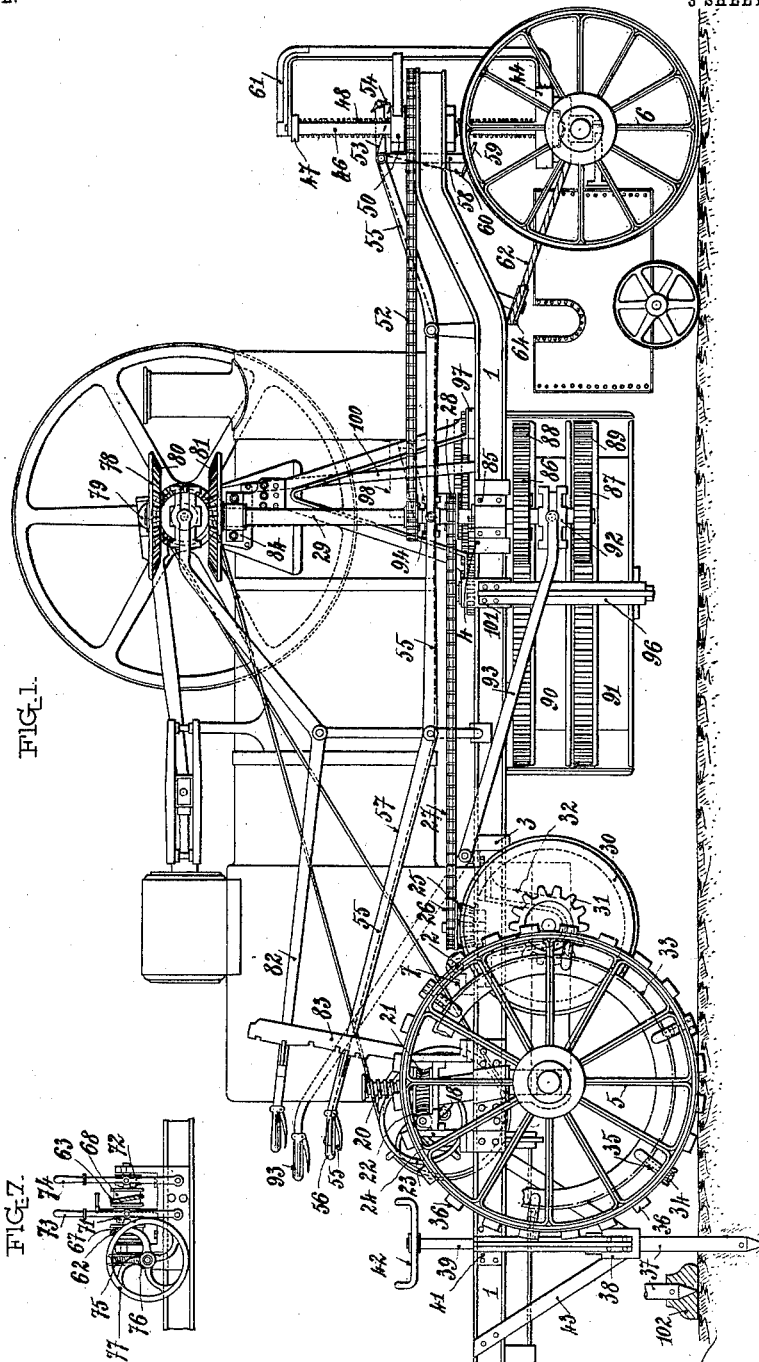

No. 731,545.

Patented June 23, 1903.

UNITED STATES PATENT OFFICE.

NICOLAS CERNATESCO, OF CRAIOVA, ROUMANIA.

MOTOR ROAD-VEHICLE.

SPECIFICATION forming part of Letters Patent No. 731,545, dated June 23, 1903.

Application filed April 1, 1902. Serial No. 100,976. (No model.)

*To all whom it may concern:*

Be it known that I, NICOLAS CERNATESCO, a citizen of Roumania, and a resident of Craiova, Roumania, have invented certain new and useful Improvements in or Relating to Motor Road-Vehicles, (for which I have made application in Great Britain, under No. 6,635, dated March 18, 1902, and in France, dated March 13, 1902,) of which the following is a specification.

The present invention relates to motor road-vehicles whereby an ordinary locomobile may be converted into a traction-engine. The essential part of the invention comprises a frame which is mounted upon the wheels of the locomobile and supporting the various mechanisms. This frame comprises a combination of devices for the traction of the carriage, for changing the speed of the engine during its run, for leveling the frame whatever may be the unevenness of the road, and, moreover, a compensating arrangement of the steering mechanism, a combined brake for use on arable land or on the road, and finally a controlling means which allows the same frame to be adapted for any kind of locomobile.

In the accompanying drawings, illustrating, by way of example, a form of construction according to this invention, Figure 1 is a side elevation of a locomobile. Fig. 2 is a top plan view of Fig. 1. Fig. 3 is a front view of the same. Fig. 4 is a transverse view, partly in section, showing the parts of the frame and the way it is mounted in front of the boiler upon one of the girders. Fig. 5 is a view of one of the driving-wheels, showing particularly the arrangement provided for the transverse leveling of the frame of the apparatus. Fig. 6 is a lateral view of the combined brake which is used in connection with the apparatus, and Fig. 7 is a side elevation of the frame with the compensating device for the steering mechanism.

The apparatus comprises, essentially, a frame which is constituted by two girders of an I-section. These girders are connected in front and at the rear by fixed cross-pieces and at their center by cross-bars 3 and 4, which can be moved longitudinally with respect to the frame. The ends of the cross-bars 3 and 4 are fitted for this purpose in the internal grooves of the I-girders and can be secured to the latter in any desired position. The frame thus constituted is mounted upon two pairs of wheels 5 and 6, which carry the locomobile which is to be converted into a traction-engine. The rear wheels 5 can be mounted upon the pivots of an axle fixed to the frame or upon an axle specially formed or arranged to allow the transverse leveling of the frame, which latter arrangement will be described later on. The same arrangement is used for the front wheels, the axle of which can be fixed to the frame itself or combined with the parts of a mechanism for the longitudinal leveling of the frame. The other parts of the locomobile are situated on the frame, the boiler being supported at the rear by means of cross-bars mounted upon the I-girders 1 in bearings 7, while in front the boiler rests upon the cross-bar 4 of the frame, Fig. 4, by means of a support 8, to which are fixed the axles for the front wheels. Extending through this support is a rod 9, which passes through a sleeve 10 on the cross-bar 4 and is secured by a nut. In order to facilitate mounting for any kind of locomobile on the frame, the cross-bars 3 and 4 are movable and are provided to this end at one of their ends with an iron plate 11 in the form of a clip, which embraces the girder and is capable of sliding along the same. At their other ends the cross-bars 3 and 4 carry two plates 13, which are riveted at a certain distance from the ends, so as to allow of their being cut off as required according to the dimensions of the locomobile and in order to allow of their internal adjustment upon the girders 1. These plates 13 terminate into threaded rods 15, carrying a plate 14, which when secured in place maintains the girders at a determined distance from each other. These plates 13 can also be bent so as to embrace the girder and then be connected by a plate 16, secured thereto by convenient screw-bolts 17, Fig. 4.

The mechanism for the transverse leveling of the frame consists of crank-axles 18, on the horizontal pivots of which are mounted the rear wheels 5 of the locomobile. The vertical portion of each of these axles is squared and passes through a sleeve 19, attached to the girders 1. Above the sleeve 19 the axle terminates in a screw 20, which passes through a work-wheel 21, forming a nut for the latter and gearing with a worm or endless screw 22, operated by a hand-wheel 23. Each of the axles 18 forms in its vertical part an arc of a circle of which the radius is a function of the diameter of the large wheel in order to effect the continuous gearing of the transmission-pinion 25 with the rim 33 of the driving-wheel 5. The worm-wheel 21 with its controlling mechanism is arranged upon a support 24, fixed on the corresponding girder 1.

In front the frame is arranged upon an ordinary fore-carriage of the locomobile, if no special mechanism for the longitudinal leveling of the frame is used. The device adapted for converting the locomobile into a traction-engine comprises a bevel-wheel 25, integral with a pinion 26, which receives its motion from a chain 27, passing around a wheel 28, secured upon a vertical shaft 29, which is driven by the driving mechanism of the locomobile.

The bevel-wheel 25 is in engagement with a bevel-wheel 30, integral with a pinion 31, its axis being journaled in a bearing 32, fixed upon the girder 1. This pinion 31 is in engagement with a toothed rim 33, fixed upon one of the road-wheels 5 of the locomobile by means of screws 34, which extend through the rim of the wheel. These screws 34 carry on the interior of the rim rings or sleeves 35, which can be removed so as to facilitate the attachment of the toothed rim 33 to a wheel of smaller diameter.

The road-wheels 5 are provided around their fellies with non-slipping blocks or tread-surfaces 36, which prevent the wheels from slipping on the ground.

The motive power is transmitted by a bevel-wheel 78, fixed upon the driving-shaft 79 of the locomobile and engaging with one or other of two bevel-gears 80 and 81, which are keyed onto a vertical shaft, so as to transmit motion in one or other direction, according to the operation of a lever 82, provided to throw either the wheel 80 or the wheel 81 in or out of engagement.

The vertical shaft is journaled in two bearings 84 and 85, the upper one, 84, of which is fixed at an adjustable height upon a suitable support attached to the girder 1. The lower bearing 85 is fixed laterally upon the girder 1.

In order to avoid the vibration in the locomobile, two counter-brackets 100 are fixed, on the one hand, to the two bearings 84 of the locomobile and, on the other hand, to the frame.

In order to level the frame in a longitudinal direction, a special mechanism is arranged which is combined with the front of the fore-carriage of the machine. This mechanism comprises a plate 44, which is supported upon the axle 45 of the front wheel 6 and the ends of which are fixed to vertical supporting-bars 46, connected at their upper ends by a cross-bar 47. In the center of the plate 44 is mounted the lower end of a vertical screw 48, upon which is movable a screw-nut 49, Fig. 3. The latter is arranged between two cross-bars 50 and 51, which are connected at their ends to the girders 1 of the frame. The two supporting-bars 46 extend through the cross-bars 50 and 51, through which also extends the screw 48. The frame thus constituted resting upon the screw-nut 49 receives a vertical ascending or descending motion by the rotation of the screw 49, which for this purpose is toothed, so as to engage with a chain 52, operated by the vertical driving-shaft 29.

The regulation of the transmission movement and of the vertical adjustment of the front of the frame is effected by a lever 57, the engaging collar 94 of which, positively influenced by the shaft 29, engages at will either with the wheel 28 or with the wheel of the chain 52.

The device for leveling the frame in a longitudinal direction is combined with a safety mechanism which prevents the breakage of the chain 52 when the screw 49 arrives at the end of its spindle 48. This mechanism consists of a lever secured to the cross-bar 50 and carrying upon one of its arms 53 an angle-piece 54, which is attached to the end of a rod 55, extending the whole length of a rod connected with the lever 57, and the other end of which is connected to the operating-handle 56 of the lever 57. As soon as the front part of the frame rises and arrives near the fork of the fore-carriage frame the small angle-lever 54 presses first of all against the said fork and pulling the wire 55 releases the bolt of the lever, which transfers the motion through the shaft 29 to the chain 52, which is thus automatically stopped. The reverse rotation of the nut 49 is limited by the arrangement on the other arm 58 of the operating-lever of another small lever 59, connected by a wire or rod 60 to the main wire or rod 55 in such a manner that upon the descent of the front frame and its arrival at the end of its course this small lever will abut against the transverse plate 44 in order to automatically operate the clutch for transmitting the motion to the nut 49. The mechanism for longitudinally leveling the frame necessitates a special arrangement for compensating the variations which are due to the length of the steering mechanism. This arrangement is as follows: The two steering-cords 62 and 63, the ends of which are connected to the front axle 45, pass over two pulleys 64 and 65 and over a common pulley 66 along the frame to the rear platform of the latter. Here and upon one of the girders 1 are arranged two small pulleys 67 and 68, over which run the ropes 62 and 63 after being guided over two idle pulleys 69 and 70. The two pulleys 67 and 68 are placed upon an axle the operation of which is dependent upon two clutches 71 72, which are operated upon by means of levers 73 and 74. The shaft of the pulleys 67 and 68 carries a worm-wheel 75, which receives its motion from an endless screw 76, operated by the hand-wheel 77. The locomobile thus converted into a traction-engine is particularly destined for agricultural purposes and comprises a mechanism for winding up the traction-rope of a plow, which mechanism, suspended from the carriage, is driven by the motor of the locomobile. To this end the vertical shaft 29 carries at its lower end two pinions 86 87, which engage with toothed wheels 88 and 89, arranged, respectively, on drums 90 and 91, on which the traction-ropes are wound. The pinions 86 and 87 are thrown in and out of engagement by a clutch operated by a hand-lever 93. Two of these drums 90 and 91 should be arranged when working with a single locomobile, though it is evident that a single drum in each could be arranged in case two locomobiles were in use. The drums turn on a common axle 95, the upper end of which is journaled in a bar 101, transversely mounted on the frame and adapted to slide longitudinally on the girders 1, so as to allow an adjustment of the drums conveniently to the shaft 29 and according to the dimensions of the locomobile. To the cross-bar 101 is fixed a frame 96, embracing the drums, and in the center of the lower cross-bar of the frame rests the lower end of the axle 95.

The winding apparatus consists of a pinion 97, connected to the upper drum and operating a cam 98 with a helicoidal groove in order to vary the height of the pulleys over which the traction-ropes pass. This arrangement can be provided according to requirements or convenience either to the right or left of the axle 95 of the drums 90 and 91. The whole device thus constructed is completed by a combined brake for either stopping during the working or for braking purposes on the road. This brake consists of a square rod 37, the lower end of which is pointed and adapted to be driven into the ground if it is desired to use it as a stopping-stake. The rod 37 extends through a guide-support 38, which is connected by brackets 43 to the girder 1. Above the support 38 the rod 37 is connected by a socket 40 to the end of a screw-spindle 39, passing through a sleeve 41, which forms the female screw. The screw 39 on being moved vertically by turning a handle 42 raises or lowers the rod 37 accordingly. If it is desired to use this arrangement as a brake, a brake-shoe 102 is attached to the lower end of the rod 37. The locomobile thus forms a traction-engine, with the great advantage of itself effecting the transport of all the necessary materials for plowing, &c., without necessitating the use of special transport-vehicles for such materials.

It is evident that the machine if destined for level roads and ground could be much simplified by omitting the mechanism for the transverse and longitudinal leveling of the frame and all its accessory parts.

What I claim as my invention, and desire to secure by Letters Patent, is—

1. Apparatus for converting a locomobile into a traction-engine, comprising a frame composed of longitudinal girders, fixed cross-pieces connecting said girders at their front and rear ends, and cross-bars connecting the girders at their center and movable longitudinally for the purpose specified.

2. Apparatus for converting a locomobile into a traction-engine comprising a frame composed of longitudinal girders, of I shape in cross-section, fixed cross-pieces connecting said girders at their front and rear ends, cross-bars connecting the girders at their center, a plate 11 at one end of each of the cross-bars engaging a girder, and plates 13 secured to the cross-bars at some distance from the ends, said plate 13 terminating in threaded rods, and plates 14 on the latter rods, and embracing the girder.

3. Apparatus for converting a locomobile into a traction-engine, comprising a frame composed of longitudinal girders, fixed cross-pieces connecting said girders at their front and rear ends, and cross-bars connecting the girders at their center and movable longitudinally for the purpose specified, sleeves 19 on the longitudinal girders, crank-axles 18 passing through the sleeves, a screw 20 on each axle passing through a wheel 21, an endless screw with which the screw 20 engages, and a support for the wheel 21 arranged on one of the girders.

In testimony whereof I have signed my name to this specification in the presence of two subscribing witnesses.

NICOLAS CERNATESCO.

Witnesses:
LOUIS SULLIGER,
EDWARD P. MACLEAN.